United States Patent Office 3,426,816
Patented Feb. 11, 1969

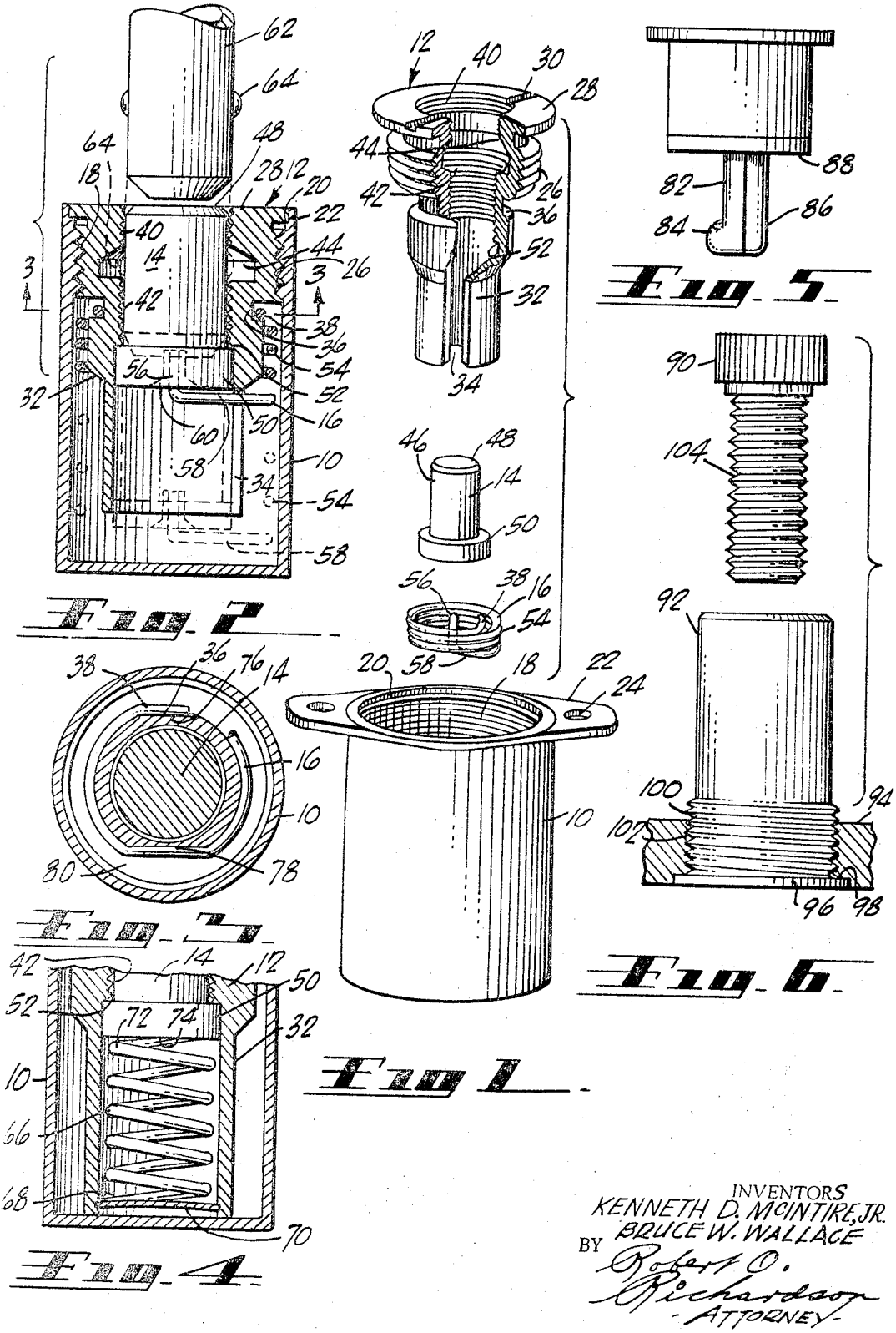

3,426,816
FASTENER RECEPTACLE
Kenneth D. McIntire, Jr., Norwalk, Calif., and Bruce W. Wallace, Seattle, Wash., assignors, by mesne assignments, to McDonnell Douglas Corporation, Santa Monica, Calif., a corporation of Maryland
Filed Nov. 22, 1966, Ser. No. 596,306
U.S. Cl. 151—41.7             3 Claims
Int. Cl. F16b 39/00, 19/00, 37/00

ABSTRACT OF THE DISCLOSURE

A fastener receptacle having removable inserts to accommodate a plurality of types of fasteners and wherein the receptacle opening is closed during non-use.

Background of the invention

Fastener receptacles are fittings mounted in a panel, wall or floor with suitable openings to receive and retain a fastener therein for the purpose of maintaining instruments, equipment or cargo in fixed relation thereto. The openings of such receptacles, when not in use, should be covered or plugged up in such a manner that dirt or moisture will not enter and damage the threads or fill the receptacle so that a fastener cannot be inserted therein. Once such a receptacle has been mounted in a floor, panel or wall, such as by screws, bolts, rivets or other permanent fastening means, it is often desirable to use these receptacles with a variety of fasteners. It also is important that the receptacle accommodate fasteners of various sizes. Moreover, in the event of damage, the part of the receptacle receiving the fastener should be replaceable without removal of the receptacle permanent fastening means.

Summary of the invention

The fastener receptacle comprising the present invention consists of a permanently mountable, internally threaded, receptacle case adapted to accommodate an externally threaded, readily removable insert assembly having a flush mounted, spring biased plunger in the fastener opening of the receptacle. Depression of the plunger into the opening exposes the internally threaded surface of the insert opening which accommodates various types of externally threaded fasteners. In addition, there is an annular recess on the inner surface of the insert opening to accommodate a quick release locking pin having protrusions which fit into the annular recess to fasten the pin in place. The interchangeable feature of the insert assembly permits the use of various fasteners, replacement of damaged inserts, and a quick conversion to other types of inserts to accommodate fasteners having different thread pitch and diameters, if necessary.

It is therefore an object of this invention to provide for a novel fastener receptacle.

It is another object of this invention to provide for a receptacle for the accommodation of a multiple of types of fasteners.

It is a further object of this invention to provide for a fastener receptacle insert for the accommodation of various types of fasteners wherein said insert is easily interchangeable with others to permit receptacle use with fasteners of other kinds and sizes.

A further object is the provision of a fastener receptacle having a removable insert to permit its replacement without detachment of the receptacle from the object on which it is mounted.

A further object is the provision of a fastener receptacle having a flush fitted plunger to close the fastener opening of said receptacle when not in use.

Another object is the provision of a fastener receptacle having a depressible flush fitted plunger to accommodate the insertion of a fastener and to close said receptacle when said fastener is removed.

These and other objects will become more readily apparent to those skilled in the art as a description of an embodiment of this invention proceeds, now having reference to the drawings, wherein:

Brief description of drawings

FIG. 1 is an exploded view of the fastener receptacle with part of the insert broken away to expose the interior thereof to view;

FIG. 2 is a vertical sectional view showing the assembled connector adapted to receive a quick release locking pin;

FIG. 3 is a sectional view taken along the line 3—3 of FIG. 2 to illustrate one manner in which the spring may be secured to the insert;

FIG. 4 is a vertical partial section showing an alternate form of applying bias to the plunger;

FIG. 5 is an elevational view of an alternate form of fastener; and

FIG. 6 is a sectional view showing an alternate form of receptacle mounting and another form of fastener that may be used.

Description of illustrative embodiments

Reference is now made to FIG. 1 wherein there is shown a case 10, insert 12, plunger 14 and biasing spring 16, shown in an exploded perspective view to illustrate the relationship of the various components. The case 10 is cylindrical in shape with internal threads 18 extending inwardly from the top recessed surface 20 to define a fastener receiving opening. A securing flange 22 extends outwardly from surface 20 and has apertures 24 therein for the purpose of fastening the case by means of rivets, screws or bolts to a desired wall, panel or floor, not shown.

Insert 12 has exterior threads 26 of suitable pitch and diameter to mate with threads 18 inside case 10. To maintain the insert 12 therein, insert 12 has an upper surface collar 28 which abuts against the recessed surface 20 of case 10 when the insert 12 is properly mounted therein. A screw slot 30 extends across the face of surface 28 of the insert to facilitate installation of the insert into case 10. Insert 12 has a cylindrical sleeve 32 having a longitudinal slot 34 therein. An annular groove 36 is provided in the outer surface of the cylindrical sleeve 32 near its top to accommodate an inwardly turned upper terminal 38 of the biasing spring 16. The inner surface of insert 12 is threaded with internal threads 40 and 42 between which is an annular recess 44. These threads are of a predetermined pitch and diameter to accommodate bolts and other fittings to be retained by the receptacle. The recess accommodates outwardly extending protrusions by which some fasteners operate.

Plunger 14 consists of a cylindrical barrel 46 having a diameter of such size as to permit longitudinal movement within the insert 12. End 48 of the plunger, in one position, will fit flush with surface 28 of the insert 12. Plunger 14 also has an enlarged collar 50 which engages with shoulder 52 at the upper end of cylindrical sleeve 32 of the insert. Cylindrical sleeve 32 has an inner diameter large enough to accommodate the longitudinal movement of the enlarged collar 50 of the plunger 14.

Biasing spring 16 urges plunger 14 upwardly to seat the enlarged portion 50 of plunger 14 against shoulder 52 of the insert 12 and to position the top surface 48 of the plunger 14 flush with surface 28 of the insert 12. This biasing spring consists of a plurality of coil windings 54. The upper end of the biasing spring 16 has an inwardly turned upper terminal 38 which rests within the annular groove 36 on the outer surface of the insert 12. The lower end of the biasing spring 16 terminates in an inwardly and upwardly directed terminal 56 which engages the bottom of plunger 14 to urge the plunger upwardly. The inwardly directed portion 58 of the lower end of the spring passes through slot 34 in the cylindrical sleeve 32 of the insert.

In assembling the fastener connector, plunger 14 is first inserted in the bottom of the cylindrical sleeve 32 and biasing spring 16 is passed over the cylindrical sleeve with the inwardly directed portion 58 passing through the slot 34 in the sleeve. The spring is then elongated and the inwardly turned upper terminal 38 is placed within groove 36. The spring 16 thus holds the plunger 14 in position with the upper surface 48 of the plunger flush with the surface 28 of the insert 12. The insert 12 is then ready for positioning in case 10 and this may be affected by using a screwdriver in slot 30 to threadedly engage threads 26 of insert 12 with the threads 18 of case 10.

Quite obviously other inserts may be used since they are readily removable and may be re-inserted into case 10 without disturbing the permanent mounting of the case 10 to the panel, wall or floor to which it has been attached. This is particularly advantageous when a fastener jams in an insert. When this occurs, the fastener and insert may be removed and a new insert readily installed. The diameters of the openings in the interchangeable inserts may be of different sizes to accommodate fasteners having different diameters.

FIG. 2 shows the fastener receptacle with its various components in assembled condition, ready for use. The case 10 is shown in cross section and turned 90° from its position in FIG. 1 so that the apertures 24 on the securing flange 22 are not shown. The upper inner surface of case 10 has threads 18 engaging threads 26 of the insert 12. The upper end of case 10 has a recess 20 to accommodate the enlarged collar surface 28 of insert 12. Plunger 14 is shown with its enlarged portion 50 in engagement with shoulder 52 of the insert 12, and with its top surface 48 flush with surface 28 of the insert. Spring 16 is shown with its inwardly turned upper terminal 38 positioned within the circumferential groove 36 on the outer surface of insert 12. Turns 54 of spring 16 extend around the cylindrical sleeve 32. The in-turned portion 58 of the spring 16 passes through slot 34 and the up-turned end 56 fits into the countersunk bore 60 in the bottom of plunger 14. The end of a quick release locking pin 62 is shown having a diameter such that it will fit within the opening of the insert 12. This opening is defined by the internal threads 40 and 42 which are spaced apart by the annular recess 44. The quick release locking pin is of a type having outwardly directed protrusions or locking balls 64 which may be inwardly depressible by means of a handle, not shown. As the pin is inserted downwardly, the plunger 12 is moved downwardly against the biasing of spring 16 to permit the pin to penetrate into the opening in insert 12. When fully inserted, the protrusions 64 fit within the annular recess 44, as shown in dotted line. The downward depression of plunger 12 and the elongation of spring 16, as a result, is also shown in dotted line. When the quick release locking pin 62 is removed, the bias of spring 16 again causes plunger 12 to move upwardly to fill the opening from which the pin was removed.

FIG. 3 is a plan view taken along the line 3—3 in FIG. 2 to show more clearly the attachment of the bias spring 16 within the groove 36 by the inwardly turned upper terminal 38 of the spring. The annular recess has a pair of flat faces 76, 78 against which the inwardly turned upper terminal 38 and a corresponding parallel portion 80 of the spring 16 can abut in order to firmly retain spring 16 in this assembled position. The cylindrical casing 10 is large enough to permit vertical movement of spring 16 without interference with the inner surface thereof.

FIG. 4 is a vertical sectional view of the lower portion of fastener connector 10 in which a modification of the plunger biasing means is shown. Here a uniformly coiled biasing spring 66 rests with its lower end 68 positioned on a retaining ring 70 at the bottom of insert sleeve 32, and with its upper terminating end 72 abutting the lower surface 74 of the enlarged portion 50 of plunger 14. This spring urges the enlarged portion 50 against shoulder 52 of the insert 12. With this type of bias means, the cylindrical sleeve 32 does not need the longitudinally extending slot 34 in the earlier described modification.

FIG. 5 is an elevational view of a fitting known as a "cleco" fitting now in popular use. This fitting operates with a downward depression of stem 82 in order for the protrusion 84 thereon to extend downwardly below the end of stem 86. When in this position it is readily insertable into the opening at the top of insert 12 until the lower surface 88 of this fitting abuts the top surface 28. Protrusion 84 then fits within the annular recess 44 in insert 12 until such time as the "cleco" fitting is again removed.

In FIG. 6 a conventional bolt 90 is shown in combination with a fastener receptacle 92 having a different form of attachment to panel 94. The fastener receptacle 92 in this embodiment has a flange 96 positioned within a recess 98 on the outer surface of wall 94 and, in addition, has threads 100 on its outer surface which are threadedly engageable with threads 102 in the aperture of wall 94 made to accommodate the receptacle 92. The threads 104 of bolt 90 are of a diameter and pitch to engage the inner threads of the fastener opening of the insert, not shown, in the casing receptacle 92.

While several modifications of inserts, spring bias means, and securing means for the case of the receptacle comprising the present invention have been illustrated, it is to be understood that these modifications are not to be considered as all-inclusive, but are exemplary, only, and it is to be understood that other modifications will readily occur to those skilled in the art after the foregoing has been read and understood by them. Accordingly, it is to be understood that the invention is not limited to the embodiments shown but is to be construed as encompassing all modifications readable upon the appended claims.

What we claim is:

1. A receptacle for receiving and retaining a fastener, said receptacle comprising:
   a case having an insert opening at one end thereof;
   a removable insert positioned in said opening;
   said insert being threadedly engageable with the inner surface wall of said case to permit removal and replacement of said insert without removal of said case from a structure to which it might be attached;
   said insert having removal means thereon for engagement with a removal tool;
   said insert having an outer face with a fastener opening therein;
   fastener retaining means within said insert communicating with said fastener opening; and
   a plunger within said fastener opening positioned with its outer face flush with said insert outer face;
   said plunger being depressible upon insertion of a fastener into said fastener opening;
   said fastener retaining means including an annular recess forming a transverse abutment surface spaced from said opening and on the inner surface of said insert to receive outwardly directed protrusions on a quick-release fastener inserted therein and internal threads on the inner wall of said insert and extending inwardly from said insert outer face to receive a threaded fastener to be retained thereby.

2. A receptacle as in claim 1, wherein said removable insert includes a cylindrical sleeve having an inner diameter of sufficient size to permit longitudinal movement of said plunger therein;

said insert having spring biasing means urging said plunger in one direction;
said sleeve having a slot extending longitudinally therein;
said spring biasing means comprising a tension spring mounted exteriorly on said sleeve;
said spring having the lower end thereof extending inwardly through said slot and in engagement with said plunger.

3. A receptacle as in claim 2,
said sleeve having a circumferential groove in the outer surface of the wall thereof;
said tension spring having an inwardly turned upper terminal seated in said groove thereby to cause tension on said spring upon downward depression of said plunger.

References Cited

UNITED STATES PATENTS

| 2,429,190 | 10/1947 | McArthur | 24—211 |
| 2,984,884 | 5/1961 | Chapman et al. | 85—5 |
| 2,948,383 | 8/1960 | Modrey | 24—211 |

FOREIGN PATENTS

| 457,974 | 7/1913 | France. |
| 703,540 | 2/1954 | Great Britain. |

EDWARD C. ALLEN, *Primary Examiner.*

U.S. Cl. X.R.

85—32, 5